(12) United States Patent
O'Farrill Haro (10) Patent No.: US 8,769,881 B2
(45) Date of Patent: Jul. 8, 2014

(54) PNEUMATIC FRAME FOR TEXTILE TO CONTROL AND/OR MODIFY LIGHT

(76) Inventor: Eamon Conmac Sebastian O'Farrill Haro, San Diego Churubusco (MX)

( * ) Notice: Subject to any disclaimer, the term of this patent is extended or adjusted under 35 U.S.C. 154(b) by 578 days.

(21) Appl. No.: 13/009,567

(22) Filed: Jan. 19, 2011

(65) Prior Publication Data

US 2012/0080154 A1  Apr. 5, 2012

(30) Foreign Application Priority Data

Oct. 1, 2010  (MX) .................... MX/a/2010/010892

(51) Int. Cl.
*F21V 7/10* (2006.01)
*E04H 15/20* (2006.01)

(52) U.S. Cl.
CPC . *F21V 7/10* (2013.01); *E04H 15/20* (2013.01)
USPC ............................. 52/2.18; 52/2.21; 52/656.1

(58) Field of Classification Search
USPC .......... 52/2.18, 2.21, 656.1; 40/610; 160/377, 160/351, 378; 359/443
See application file for complete search history.

(56) References Cited

U.S. PATENT DOCUMENTS

| | | | | |
|---|---|---|---|---|
| 2,060,817 A | * | 11/1936 | Mahoney ...................... | 160/352 |
| 2,297,150 A | * | 9/1942 | Hunter ............................ | 52/2.21 |
| 3,720,455 A | * | 3/1973 | Sahlin ........................... | 359/461 |
| 4,323,301 A | * | 4/1982 | Spector ......................... | 359/443 |
| 4,876,829 A | * | 10/1989 | Mattick .......................... | 52/2.18 |
| D357,492 S | * | 4/1995 | Henry ........................... | D16/241 |
| 5,546,707 A | | 8/1996 | Caruso | |
| 6,008,938 A | * | 12/1999 | Suehle et al. ................. | 359/443 |
| 6,240,666 B1 | | 6/2001 | Apel et al. | |
| 7,181,877 B2 | * | 2/2007 | Quade ............................ | 40/610 |
| 2002/0116849 A1 | | 8/2002 | Carolan | |
| 2004/0035034 A1 | | 2/2004 | Quade | |
| 2005/0068618 A1 | | 3/2005 | Poretskin | |
| 2005/0111841 A1 | | 5/2005 | Geller | |
| 2008/0231815 A1 | | 9/2008 | Ganzevoort | |
| 2010/0007949 A1 | | 1/2010 | Clawson et al. | |
| 2010/0182793 A1 | | 7/2010 | Geller | |

FOREIGN PATENT DOCUMENTS

| | | | |
|---|---|---|---|
| DE | 202009010894 U1 | 12/2009 | |
| EP | 1006504 A2 | 6/2000 | |
| FR | 2598541 A1 | 11/1987 | |

OTHER PUBLICATIONS

European Search Report Issued in EP 11181144.4 mailed on Jan. 23, 2012.

* cited by examiner

*Primary Examiner* — Mark Wendell
*Assistant Examiner* — Matthew J Smith
(74) *Attorney, Agent, or Firm* — Andrews Kurth LLP; Sean S. Wooden; Matthew J. Esserman (57) ABSTRACT

A pneumatic frame for textiles of control at of light used in the film industry or images capture with the object to reflect, block, filter, blur and make any use of light and have optimum control of it at the time of capturing the image. The pneumatic frame comprises a hose inflatable structure of at least twelve pieces with threads that allow its assembly, tucks vulcanized along its entire periphery which allow the passage of an elastic which is intertwined with the stitched slit, secured by hang setbolt devices along its entire periphery, as well as external gripping devices of type-setbolt screw pins.

18 Claims, 7 Drawing Sheets

FIG 7

PNEUMATIC FRAME FOR TEXTILE TO CONTROL AND/OR MODIFY LIGHT

RELATED APPLICATIONS

This application claims the priority of Mexican Patent Application No. MX/a/2010/010892, filed Oct. 1, 2010, which is hereby incorporated by reference in its entirety.

FIELD OF THE INVENTION

Embodiments described herein relate to a pneumatic frame for textile of control and/or modification of light used in the cinematographic, industry with the object of manipulates the required illumination at a film set.

BACKGROUND

There are portable inflatable screens with some features similar to those of the present invention; however, these screens are for the projection of images, movies, etc. They are used in outdoor events; therefore its dimensions should be larger so they can be seen by a lot of people.

Likewise, in the art there is a large number of inflatable movie screens that have been adapted by the staff in a film set for the manipulation of light required according to the needs of such film, however, due to the nature of these screens, which are for image projection, the staff faces a series of difficulties for the adjustment and manipulation of the screen, ranging from management, size, assembled, repair and removal, among other factors.

The technology of inflatable movie screens makes use of four basic components:
1) An inflatable support structure (inflatable frame)
2) A fan to inflate the structure,
3) A removable-visual screen, and
4) A connection device for connecting the removable visual screen, in the support structure.

Unlike the above mentioned components, the inflatable screens do not require additional devices for their handling, because once they are inflated, remain in the ground during all the time of the projection and do not need to move them from a side to another as in the case of the inflatable frame of the present invention. Therefore, besides the four basic components which are mentioned also the devices that are placed to fix them to the ground and not fall when strong winds occur during the use are important.

There are wide differences between the pneumatic frame proposed in this invention and the existing patents and they are described below:

Most of the inflatable screens usually are attached to the frame and do not necessarily have to be removable. In the patent FR 2598541 A1, to hold the material which contains the advertising to the inflatable frame, a nylon rope is passed through the rings placed at regular intervals on the periphery of the frame. This gripping method is simple but it does not generate enough tension in the textile, causing wrinkles in it.

U.S. Patent 2002/0116849 includes a first zipper (38) on the top of the arc and a second zipper (40) which is in the sheet that contains the advertising; the zipper does not cover the entire inner periphery of the frame it only covers the curved region of the dome-shaped structure. The remainder, i.e., the straight portion contains releasable mounting means (14) which connect the sheet that contains the advertising with, the inflatable frame. In one embodiment, the release strap (42) includes D-rings (44) sewn and assembled in the first portion (21) and the second side (22) of the frame and the corresponding hooks (46) are stitched on the first side (31) and second portion (33) of the sheet which contains the advertising (30). For their use, the hooks (46) are placed in the respective D-rings (44), thus ensuring the sheet which contains the advertising to the inflatable frame. Other alternatives proposed by U.S. Patent 2002/0116849 for hold the advertising to the frame are through a system of springs, a plug and socket connector, etc.

In the patent U.S. 2002/0116849 the parts of mandolins can not be separated, the piece is complete without the risk of losing parts of the mandolin at the time the structure is disassembled.

U.S. Patent 2004/0035034 A1 where the structure is made of multiple layers of tubes forming a rectangular prism, one side of the structure is covered with material where is printed the advertising. The material which containing images or the advertising is placed on the top of the tubular structure through hooks and a kind of loop of binding tape which is provided on the tubular structure.

U.S. Patent 2005/068618 which also proposes a structure based on tubes or in a swarm shape, unlike U.S. Patent 2004/0035034 A1, it does not place on the tubular surface other material containing the images or the advertising since the same tubular structure provides the basis on which is printed the advertising or images which is to be projected. This structure is sewn or heat welded.

The screen of patent EP 1006504 is attached to the frame through frilled seams and alternatively can be placed an adhesive tape on the seams to prevent leakage of vas in the case of U.S. Patent 2010/0007949 A1, the screen is connected directly to the inflatable frame by means of adhesives or can be welded or sewn, thus the screen could be secured to the frame inflatable. In the inflatable projection displays the same material for projects images always is used or in the case of printed advertising it is selected the appropriate material (usually referred to plastic material preferably PVC) that is compatible with printing techniques currently used or as mentioned in U.S. patent 2005/068618 wherein the tubular members should be white or silver to receive the projection or image which is projected.

SUMMARY

The above documents mentioned in the art do not have the features of this invention, embodiments which include an inflatable plastic structure that has a number of devices for securing the frame to a suitable, environment as well as securing a textile to the same with the enough tension thanks to the type-setbolt devices which has the pneumatic frame in its periphery.

The nature of this structure allows the repair of any of its component parts without the necessity of compromising the entire structure of the pneumatic frame object of this invention.

The pneumatic frame of embodiments described herein may be used in the film industry or of digital or analogue capture of images or photos, in order to reflect, block, filter, blur and make any use of light and to an optimal control thereof at the time of capturing the image, allowing shorten its assembled time compared with any similar structure, conventional used in the art, while solving and repairing the security problems generated by possible impacts of a rigid structure, caused by the sail effect generated in exteriors when the wind blow generates tension on the structure.

As opposed to the prior art, for the inflatable frame described herein not only is important the support where the textile will be placed which will work for obtain a better lighting in a film or taking photographs but also other characteristics are taken into account. Moreover, where the proposed frame is used in order to reflect, block, filter, blur and make any use of light and to have a control thereof it is generally required to continually change the type of textile with which working, which would be inappropriate to permanently adhere the textile to the frame.

DESCRIPTION OF THE DRAWINGS

The accompanying drawings are included to provide a better understanding of the invention and are incorporated and constitute part of this specification. The drawings illustrate the embodiments of the invention and together with the description serve to explain the principles of the invention.

DESCRIPTION OF THE EMBODIMENTS

The embodiments will be referred in detail; the examples are illustrated with the accompanying drawings. Whenever be possible, the same reference numbers are used in the drawings and the description to refer to the same parties.

Figure 1:
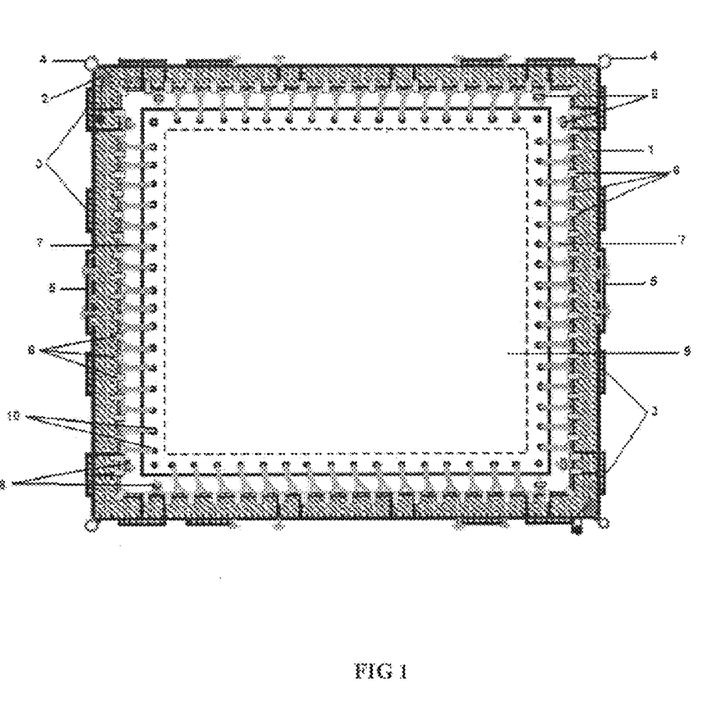
FIG. 1 illustrates the front of the pneumatic frame for textiles of control and/or modification of light according to an embodiment of the present invention.

FIG. 1 illustrates the front of the pneumatic frame for textiles of control and/or modification of light according to an embodiment of the present invention, which includes at least:

A pneumatic frame (1) that according to the desired size is composed of twelve pieces which form an structure of inflatable pneumatic hose to increase resistance to hard use.

Four filling and deflation check valves (2), which are vulcanized one in each corner of the periphery of the pneumatic frame (1), specifically in each of the elbows of the inflatable structure of the frame.

Sixteen gripping, handles (3) for manual manipulation of the pneumatic frame (1), four handles on each side of the periphery of the frame.

Four metal rings (4) for external gripping or clamping of the pneumatic frame (1) to any means, vulcanized to the frame structure, set-one at each corner of each frame.

Four external connecting devices of the frame (5) in the form of gripping pins with type-setbolt screws set parallel on each side of the pneumatic frame for fastening thereof to any external device which allows the mounting of the frame. The gripping pins with type-setbolt screw (5b) allow to receive an external connection plate (5c) illustrated in FIG. 7 of the present invention.

Fifty-nine tucks (6) which are vulcanized along the entire periphery of the pneumatic frame (1) forming a channel which will allow the passage of an elastic to hold the textile.

An elastic (7) that joins to the textile (9) with the pneumatic frame (1) through the channel of the tucks (6).

Eight hang type-setbolt devices (8) a pair disposed in each corner of the pneumatic frame that hold the elastic (7) and exert the necessary pressure to the gripping of the textile.

A textile (9) which includes tucks (10) along its entire peripheral to the gripping thereof to any mean, depending its use.

Figure 2:
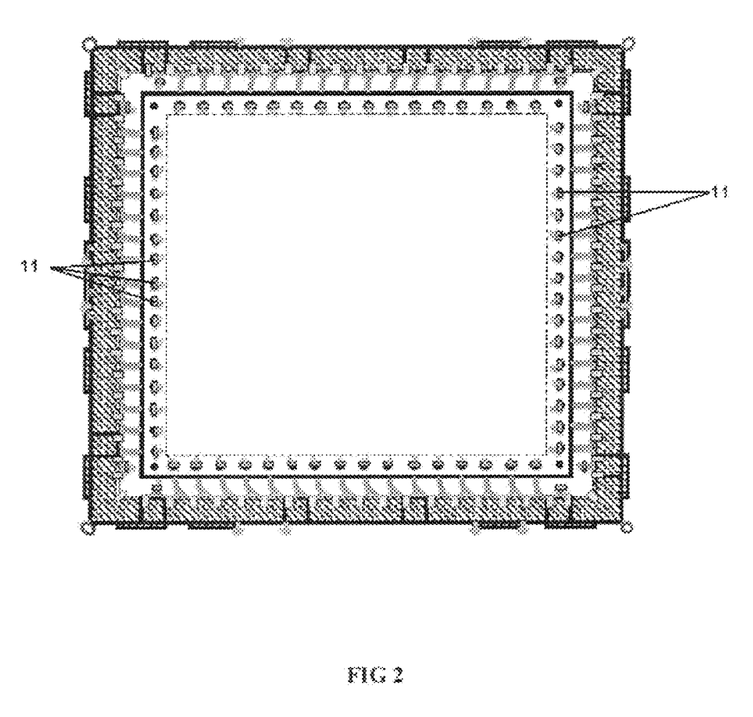
FIG. 2 illustrates the back of the pneumatic frame for textiles of control and/or modification of light according to an embodiment of the present invention.

FIG. 2 illustrates the back of the pneumatic frame for textiles of control and/or modification of light that in contrast to FIG. 1 shows to the entire length of the inner periphery of the pneumatic frame setbolt insurances (11) for each tuck of the textile, which reinforces the clamping pressure of the same pneumatic frame.

The mooring system of the textile of the pneumatic frame (1) allows the use of textiles previously acquired by the user, its pre-existing inventory can be mounted without modification.

Textile (9) is subjected along the entire periphery of the pneumatic frame (1) thanks to an elastic (7) which is intertwine between the channel which form the tucks (6) and stitched slit (10) which includes the textile (9). The elastic must go through a tuck and a stitched slit by all the periphery of the pneumatic frame, in order to ensure the pressure of the elastic and hence the fastening of the textile to the frame, type-setbolt insurances will be placed (11) in the elastic for each stitched slit shown in the back (FIG. 2) of the frame. Likewise, the pneumatic frame has a type-setbolt or hang insurances (8) in every corner of its periphery, which will hold the gripping elastic which interweaves the textile, preventing the escape of the gripping elastic.

It is recommended to use an elastic by separated for each side of the pneumatic frame, in order to retain its elastic nature and pressure for longer.

The hang type-setbolt insurance is well know in the art for the securing any conductive fiber, since it allows its passage through its hole and holds it with the manual pressure being exerted. They are used in various industrial fields such as textiles and apparel, footwear, among others. This invention makes use of it as a tool for optimal functioning together with all the elements that embody the present invention.

Figure 3:
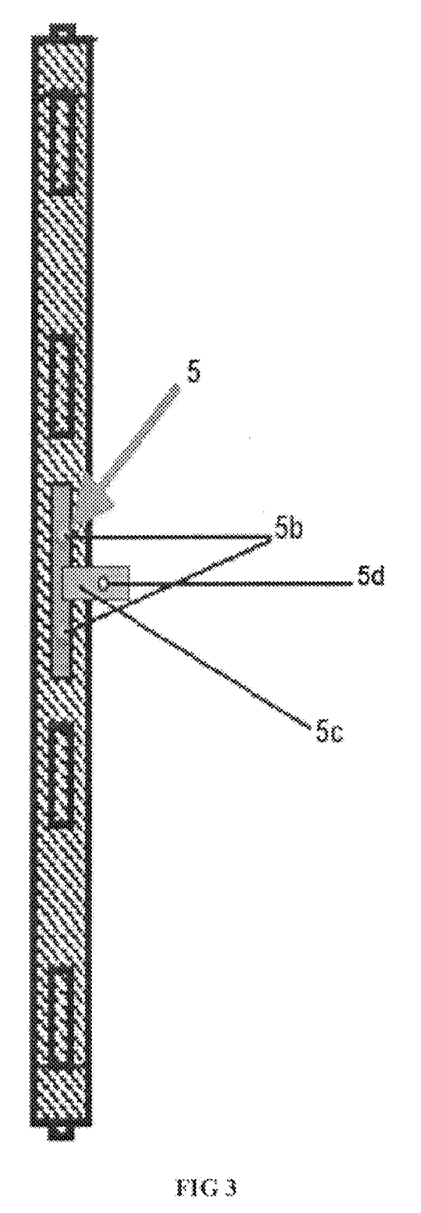
FIG. 3 illustrates an external lateral face of the pneumatic frame for textiles of control and/or modification of light according to an embodiment of the present invention.

FIG. 3 illustrates an external lateral face of the pneumatic frame (1) for textiles of control and/or modification of light according to an embodiment of the present invention, which has at least:

Four gripping handles (3) for manual manipulation of the pneumatic frame (1),

An external connection device of the frame (5) consists of two gripping pins with type-setbolt screw, vulcanized parallel to each other, which receive and are grabbed in each of the holes of the external connection device (5c) which in turn has a protrusion (5d) horizontally set which has a hole which in turn will receive another type-setbolt screw to hold the pneumatic frame to a tripod or external basis.

Figure 4:
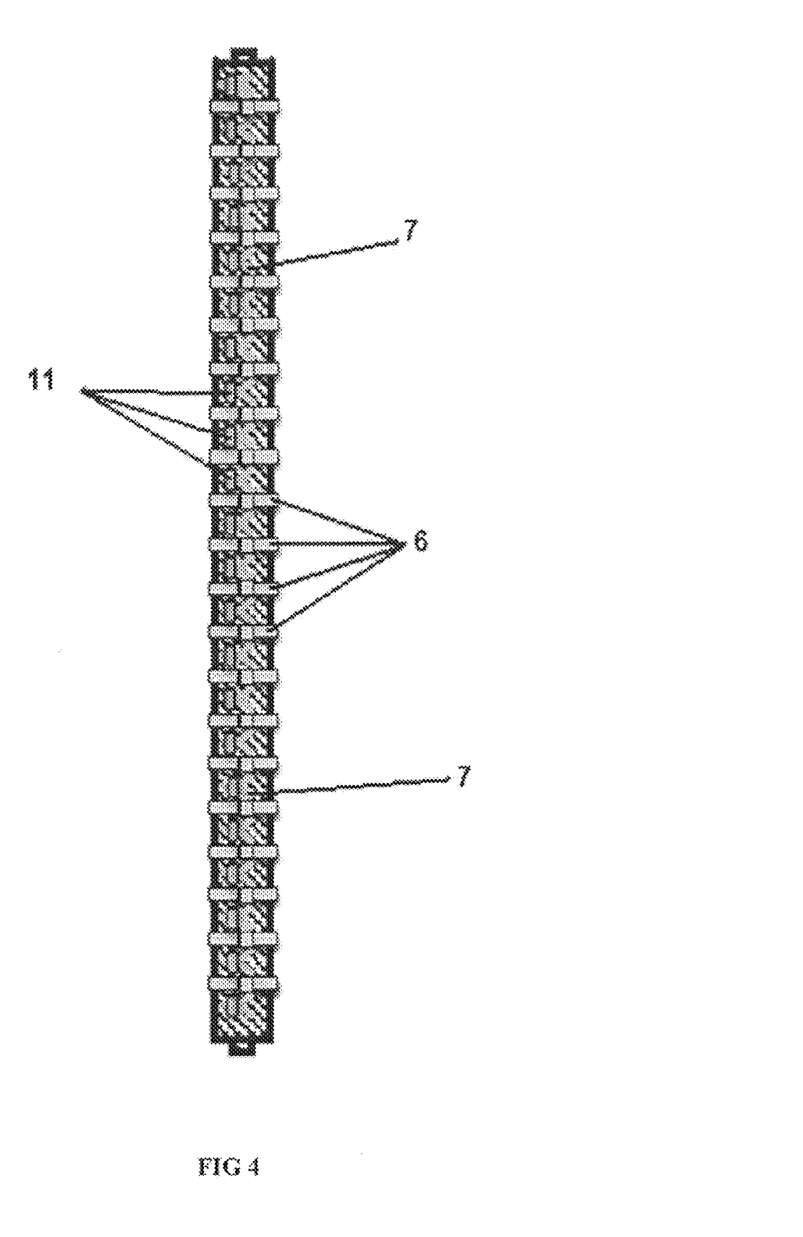
FIG. 4 illustrates an internal lateral face of the pneumatic frame for textiles of control and/or modification of light according to an embodiment of the present invention.

FIG. 4 illustrates an internal lateral fate of the pneumatic frame for textiles of control and/or modification of light according to an embodiment of the present invention, which has at least:

Tucks (6) which have been vulcanized throughout the inner periphery of the pneumatic frame (1) forming a channel that allows the passage of the elastic which will be intertwined between each tuck and stitched slit of the textile to be fastened.

Hang type-setbolt devices (11) throughout the periphery of the pneumatic frame (1), which hold the outgoing elastic between each tuck and the stitched slit, in order to provide adequate pressure and safety to the textile when it is intertwined and fastened to the pneumatic frame (1).

Figure 5:
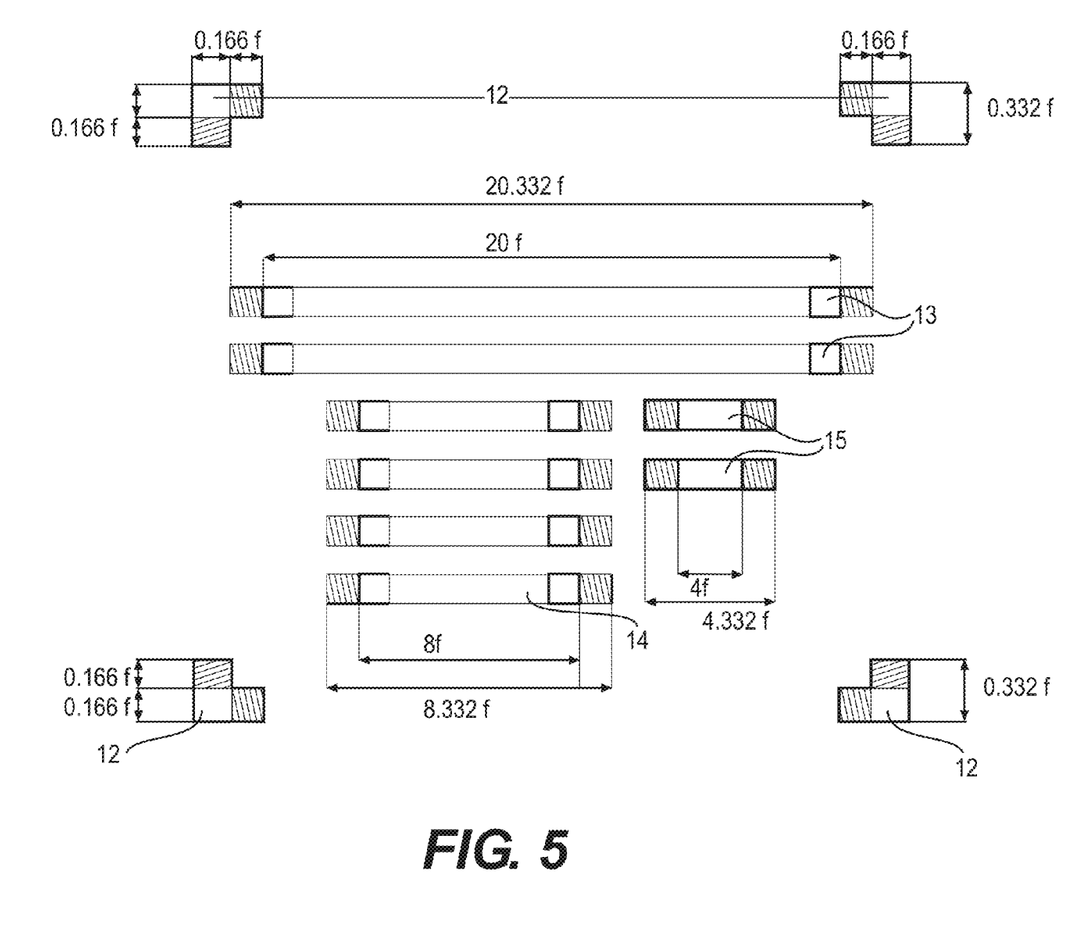
FIG. 5 illustrates the cutting up of the inflatable structure of the pneumatic frame for textile of control and/or modification of light according to an embodiment of the present invention.

FIG. 5 illustrates the pneumatic frame structure in cutting up (without assembling), which depending on its size consists of:

Four elbows (12), set one in each corner of the structure, containing a filling and deflating check valve. Elbows are rigid structures and contain screw termination for their connection to other parts of the internal structure.

Two pieces of PVC inflatable pneumatic hose of 20 feet long each (13), with screw termination for its connection to other parts of the internal structure.

Four pieces of PVC inflatable pneumatic hose of 8 feet long each (14), with screw termination for its connection to other parts of the internal structure.

Two pieces of PVC inflatable pneumatic hose of 4 feet long each (15), with screw termination for its connection to other parts of the internal structure.

The assembly by pieces of the pneumatic frame allows that in case of damage to any parts of PVC pneumatic hose either by ripping or any injury resulting in deflation of the piece, it is changed by another equal piece without modifying or compromise the integrity of entire internal structure of the pneumatic frame.

Figure 6:
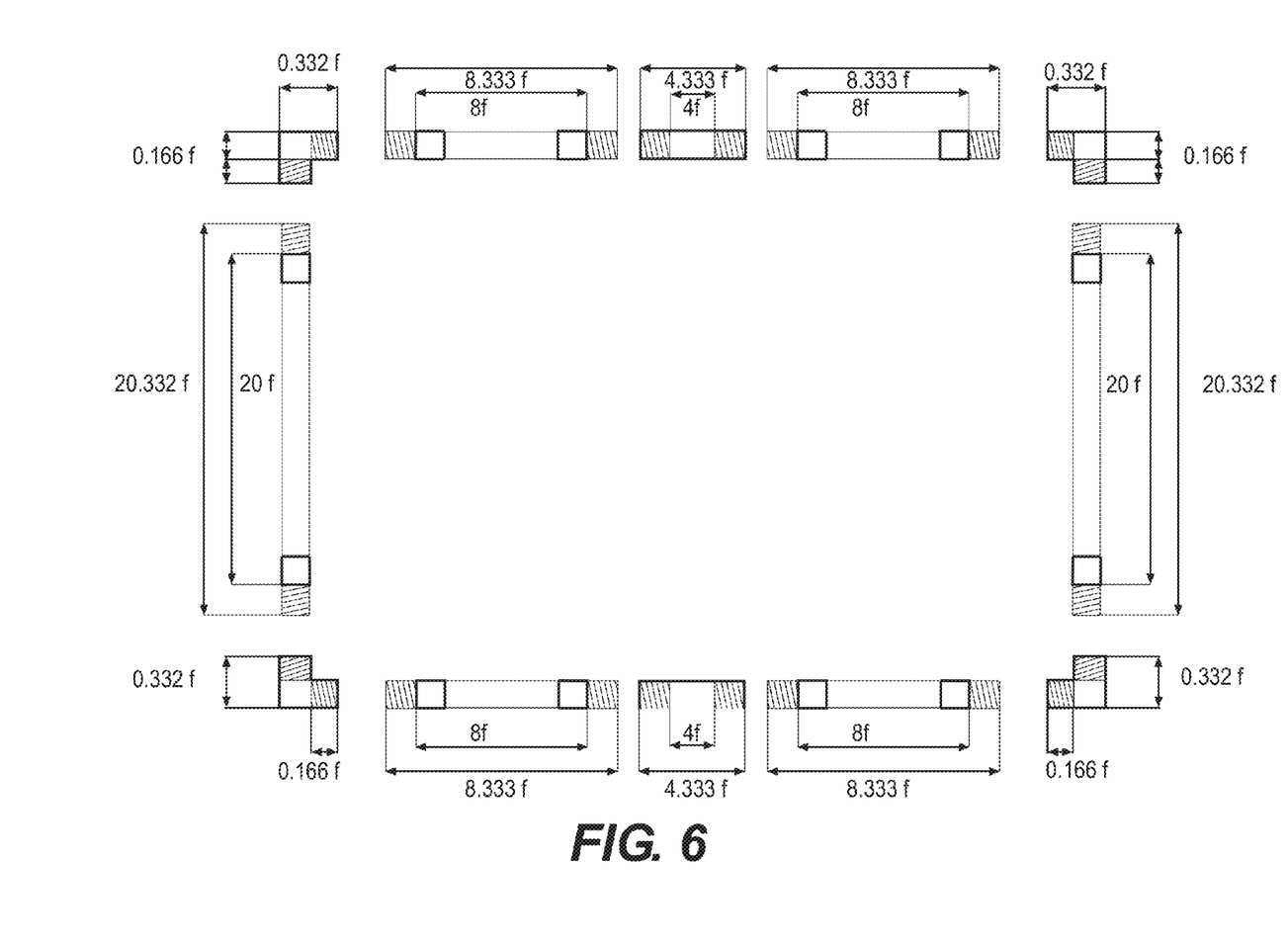
FIG. 6 illustrates the assembly of the inflatable structure for the pneumatic frame for textiles of control and/or modification of light showing its dimensions, with or without thread for its assembly, according to an embodiment of the present invention.

FIG. 6 illustrates the internal structure of the pneumatic frame in accordance with an embodiment of the present invention, where is shown the connection or assembly order of each part illustrated in FIG. 5.

Parts of 20 feet (13) are screwed into each end to an elbow which forms the corners of the pneumatic frame. In turn, each free end of each elbow shall be connected to pieces of 8 ft (14), two of these in turn connected to the two pieces of four feet (15), thus forming the pneumatic frame structure, each part of equal size set in a front tote another one.

Due to the needs and operations of each film set, the pneumatic frame object of the present invention may be of the following sizes:

20×20 feet
12×12 feet
8×8 feet
6×6 feet

The above mentioned sizes are recommended for optimal handling and versatility of the fastening pneumatic frame of textiles of control and/or modification of light, adjusting the necessary measures to scale in proportion to the parts that make up the inflatable structure of the pneumatic frame, however, it not restricted the sizes of the pneumatic frame, just to the above referenced only for objects of this invention, since in practice, the present invention allows improvisation of various dimensions of their internal structure that are required according the work spaces.

The periphery of the already assembled pneumatic frame assembly is 2 inches wide or less, which allows the reduction of shadow which sometimes reflects in the modification and filtering applications of light.

The frame should be inflated through the valves which it has at each end, thus giving the body to the same with the air entering in its structure.

Figure 7:
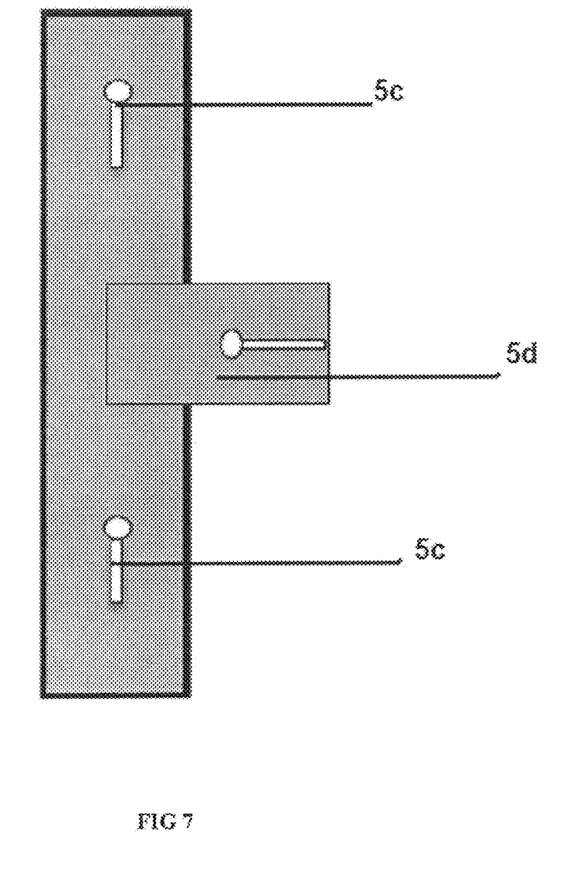
FIG. 7 illustrates in detail the outer connection piece of the pneumatic frame for textiles of control and/or modification of light according to an embodiment of the present invention.

FIG. 7 illustrates in detail the connection piece of the pneumatic frame, which is in T-shape, it contains at least two holes (5c) with a channel at each end, same which receive the gripping pins that are vulcanized in any outer side of the pneumatic frame, which enter through the hole and slide down the channel to be under pressure. Likewise, the external connection piece has at its center with a protrusion (5d) containing a channel and a hole which will receive a pin or gripping screw of any external device with which it is desired to connect or hold the pneumatic frame object the present invention.

The invention claimed is:

1. A pneumatic frame for textiles of control and/or modification of light, comprising:
    a structure of inflatable pneumatic hose, wherein the inflatable pneumatic hose includes at least twelve pieces;
    at least four filing and deflating check valves, each one vulcanized in an elbow of a corner of a periphery of the pneumatic frame;
    at least sixteen gripping handles for manual manipulation of the pneumatic frame, four handles in each side of the periphery of the frame;
    at least four metal rings for external gripping or clamping of the frame, each ring vulcanized on a corner of the frame;
    at least four external connection devices of the frame, wherein the external connection devices of the frame are gripping pins with a setbolt screw, and wherein the gripping pins with setbolt screws allow the gripping pins to receive a T-shape external connection plate, entering through the gripping pins' holes and sliding down by the gripping pins' canal to remain under pressure;
    at least fifty-nine tucks vulcanized along the periphery of the pneumatic frame;
    an elastic;
    at least eight hang type-setbolt devices;
    a textile with stitched slot along its entire periphery to hold the same in any medium, depending of its use, wherein the elastic joins to the textile; and
    a hang type-setbolt devices throughout the periphery of the pneumatic frame in the back of the pneumatic frame.

2. A pneumatic frame according to claim 1, wherein the structure of inflatable pneumatic hose comprises:
    at least four elbows set each in each corner of the structure with screw termination for connection of the hose to other parts of the internal structure;
    at least two pieces of PVC inflatable pneumatic hose of 20 feet long each, with screw termination for connection of the hose to other parts of the internal structure;
    at least four pieces of PVC inflatable pneumatic hose of 8 feet long each, with screw termination for connection of the hose to other parts of the internal structure; and
    at least two pieces of PVC inflatable pneumatic hose of 4 feet long each (15), with screw termination for connection of the hose to other parts of the internal structure.

3. A pneumatic frame according to claim 2, wherein each elbow of the inflatable pneumatic hose structure contains an air filling and deflation check valve.

4. A pneumatic frame according to claim 1, wherein the structure of the inflatable pneumatic hose comprises PVC inflatable pneumatic hose.

5. A pneumatic frame according to claim 1, wherein the structure of the inflatable pneumatic hose is assembled by means of threads that fit together and connect together forming a frame.

6. A pneumatic frame according to claim 1, wherein the structure of the inflatable pneumatic hose increases the pneumatic frame's resistance to hard use, allowing the exchange of each piece separately in case of damage without compromising the integrity of the pneumatic frame in its entirety.

7. A pneumatic frame according to claim 1, wherein the gripping pins with setbolt screws are set parallel in each side of the pneumatic frame for the holding thereof to any external device which allows the mounting of the frame.

8. A pneumatic frame according to claim 1, wherein the tucks vulcanized along the periphery of the pneumatic frame form a channel which allows the passage of the elastic to hold the textile.

9. A pneumatic frame according to claim 1, wherein the textile is attached to the frame by the elastic which is intertwined among the tucks and stitched slit.

10. A pneumatic frame according to claim 1, wherein the hang type-setbolt devices in every corner of the pneumatic frame allow the elastic to stop, exerting the necessary pressure to hold the textile.

11. A pneumatic frame according to claim 1, wherein the hang type-setbolt devices throughout the periphery of the frame in its back stop the outgoing elastic between each tuck of the frame and every stitched slit, exerting the necessary pressure to hold the textile.

12. A pneumatic frame according to claim 1, wherein the pneumatic frame is used in the film industry or of digital or analogue capture of images or photographs, in order to reflect, block, filter, blur and make any use of light and have optimum control of it at the time of capturing the image.

13. A pneumatic frame according to claim 1, wherein the textile includes any textile which has stitched slit.

14. A pneumatic frame for textiles of control and/or modification of light, comprising:
  a structure of inflatable pneumatic hose, wherein the inflatable pneumatic hose includes at least twelve pieces;
  at least four filing and deflating check valves, each one vulcanized in an elbow of a corner of a periphery of the pneumatic frame;
  at least sixteen gripping handles for manual manipulation of the pneumatic frame, four handles in each side of the periphery of the frame;
  at least four metal rings for external gripping or clamping of the frame, each ring vulcanized on a corner of the frame;
  at least four external connection devices of the frame;
  at least fifty-nine tucks vulcanized along the periphery of the pneumatic frame;
  an elastic;
  at least eight hang type-setbolt devices;
  a textile with stitched slot along its entire periphery to hold the same in any medium, depending of its use, wherein the elastic joins to the textile; and
  a hang type-setbolt devices throughout the periphery of the pneumatic frame in the back of the pneumatic frame;
  wherein the periphery of the pneumatic frame already assembled is of 2 inches wide or less, which allows the reduction of shadow which sometimes reflects in the modification and filtering applications of light.

15. A pneumatic frame according to claim 14, wherein the tucks vulcanized along the periphery of the pneumatic frame form a channel which allows the passage of the elastic to hold the textile.

16. A pneumatic frame according to claim 14, wherein the textile is attached to the frame by the elastic which is intertwined among the tucks and stitched slit.

17. A pneumatic frame according to claim 14, wherein the hang type-setbolt devices in every corner of the pneumatic frame allow the elastic to stop, exerting the necessary pressure to hold the textile.

18. A pneumatic frame according to claim 14, wherein the hang type-setbolt devices throughout the periphery of the frame in its back stop the outgoing elastic between each tuck of the frame and every stitched slit, exerting the necessary pressure to hold the textile.

\* \* \* \* \*